United States Patent
Watanabe et al.

(10) Patent No.: US 10,513,456 B2
(45) Date of Patent: Dec. 24, 2019

(54) HEAT-RESISTANT ROLL, MANUFACTURING METHOD THEREOF, AND PLATE GLASS MANUFACTURING METHOD USING SUCH HEAT-RESISTANT ROLL

(71) Applicant: NICHIAS CORPORATION, Tokyo (JP)

(72) Inventors: Kazuhisa Watanabe, Tokyo (JP); Tetsuya Mihara, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 365 days.

(21) Appl. No.: 15/022,074

(22) PCT Filed: Aug. 22, 2014

(86) PCT No.: PCT/JP2014/004331
§ 371 (c)(1),
(2) Date: Mar. 15, 2016

(87) PCT Pub. No.: WO2015/040796
PCT Pub. Date: Mar. 26, 2015

(65) Prior Publication Data
US 2016/0221861 A1    Aug. 4, 2016

(30) Foreign Application Priority Data
Sep. 19, 2013    (JP) .................................. 2013-194326

(51) Int. Cl.
*C03B 35/00* (2006.01)
*F16C 13/00* (2006.01)
(Continued)

(52) U.S. Cl.
CPC ............ *C03B 35/181* (2013.01); *B24B 7/241* (2013.01); *B24B 7/242* (2013.01);
(Continued)

(58) Field of Classification Search
CPC ......... B24B 7/242; B24B 7/241; C04B 33/36; C04B 41/87; C04B 35/62218;
(Continued)

(56) References Cited

U.S. PATENT DOCUMENTS

2003/0181302 A1    9/2003  Kaiser et al.
2004/0220032 A1    11/2004 Nakayama et al.
(Continued)

FOREIGN PATENT DOCUMENTS

JP    2001-287823 A    10/2001
JP    2004-299980 A    10/2004
(Continued)

OTHER PUBLICATIONS

CD BArton and A.D. Karathanasis, Clay Minerals, 2002, Encyclopedia of Soil Science.*
(Continued)

*Primary Examiner* — Sarang Afzali
(74) *Attorney, Agent, or Firm* — Oliff PLC

(57) ABSTRACT

A method for producing a heat-resistant roll, and a roll produced by the method, the method including: fabricating a roll part comprising 5 wt % or more of a clay mineral; grinding the roll surface of the roll part; conducting a surface treatment in which the ground roll surface is smoothed in a moisturized state; and forming a coating film of a clay mineral on the surface-treated roll surface.

14 Claims, 3 Drawing Sheets

(51) Int. Cl.
*C03B 35/18* (2006.01)
*C04B 41/50* (2006.01)
*C04B 35/622* (2006.01)
*B24B 7/24* (2006.01)

(52) U.S. Cl.
CPC .... *C04B 35/62218* (2013.01); *C04B 41/5037* (2013.01); *F16C 13/00* (2013.01); *C04B 2235/963* (2013.01); *Y10T 29/49563* (2015.01)

(58) Field of Classification Search
CPC .............. C04B 41/5037; C04B 41/009; C04B 2235/3481; C04B 2235/349; C04B 2235/5228; C04B 2235/94; C04B 2235/963; C04B 2235/3472; F16C 13/00; C03B 35/181; C03B 35/18; C03B 35/16; C03B 35/189; Y10T 29/49544
USPC ...................................... 492/53, 59; 428/454
See application file for complete search history.

(56) References Cited

U.S. PATENT DOCUMENTS

| | | | |
|---|---|---|---|
| 2005/0212158 A1 | 9/2005 | Kaiser | |
| 2007/0231526 A1 | 10/2007 | Nakayama et al. | |
| 2008/0120995 A1* | 5/2008 | Neubauer | C03B 17/068 65/33.7 |
| 2010/0064729 A1 | 3/2010 | Nakayama et al. | |
| 2010/0240511 A1 | 9/2010 | Nakayama et al. | |
| 2011/0259538 A1 | 10/2011 | Nakayama et al. | |
| 2012/0298476 A1 | 11/2012 | Nakayama et al. | |
| 2014/0034257 A1 | 2/2014 | Nakayama et al. | |
| 2014/0116093 A1 | 5/2014 | Nakayama et al. | |
| 2014/0283556 A1 | 9/2014 | Nakayama et al. | |

FOREIGN PATENT DOCUMENTS

| | | |
|---|---|---|
| JP | 2005-520774 A | 7/2005 |
| JP | 3795671 B2 | 4/2006 |
| JP | 2006-143666 A | 6/2006 |
| JP | 2007-269604 A | 10/2007 |
| JP | 2010-95437 A | 4/2010 |
| JP | 5219059 B2 * | 6/2013 |
| WO | 2012/070650 A1 | 5/2012 |

OTHER PUBLICATIONS

English Machine Translation of JP5219059B2, published Jun. 26, 2013.*
English translation of the written opinion of the International Searching Authority issued in corresponding application PCT/JP2014/004331, dated Sep. 22, 2014.
International Search Report issued in corresponding application PCT/JP2014/004331, completed Sep. 12, 2014 and dated Sep. 22, 2014.

* cited by examiner

HEAT-RESISTANT ROLL, MANUFACTURING METHOD THEREOF, AND PLATE GLASS MANUFACTURING METHOD USING SUCH HEAT-RESISTANT ROLL

This is a National Phase Application in the United States of International Patent Application No. PCT/JP2014/004331 filed Aug. 22, 2014, which claims priority on Japanese Patent Application No. 2013-194326, filed Sep. 19, 2013. The entire disclosures of the above patent applications are hereby incorporated by reference.

TECHNICAL FIELD

The invention relates to a heat-resistant roll, a production method thereof, and a plate glass production method using such a heat-resistant roll. In particular, the invention relates to improvement in heat-resistant roll properties such as low dusting properties.

BACKGROUND ART

In the production of plate glass, in order to convey glass ribbon in a molten state, a heat-resistant roll provided with a roll part is used. In order to produce high-quality plate glass that is suited to a liquid glass display or a plasma display, it is required to suppress unfavorable effects exerted on glass ribbon by this heat-resistant roll as much as possible.

Under such circumstances, Patent Documents 1 to 3 propose polishing of the surface of the roll part as finishing of a heat-resistant roll. Patent Document 4 describes smoothing of the surface with water after polishing.

RELATED ART DOCUMENTS

Patent Documents

Patent Document 1 JP-A-2004-299980
Patent Document 2 JP-A-2007-269604
Patent Document 3 JP-T-2005-520774
Patent Document 4 JP-A-2010-095437

SUMMARY OF THE INVENTION

However, when a high-quality, thin plate glass used in a liquid crystal display, a plasma display or the like is produced, a high-degree of cleanness is required for the roll surface. Therefore, a further lowering in dusting properties has been required.

The invention has been made in view of the above-mentioned problem, and an object of the invention is to provide a heat-resistant roll in which dusting from the surface of the roll part is reduced, a production method thereof, and a plate glass production method using the same.

As a result of extensive studies, the inventors of the invention have found that dusting can be suppressed without substantially changing the properties of a heat-resistance roll by forming a coating film of a clay mineral on the surface of the roll part.

According to the invention, the following production method of a heat-resistant roll or the like are provided.

In a first preferred embodiment, there is provided a method for producing a heat-resistant roll comprising: a roll part fabricating step for fabricating a roll part comprising 5 wt % or more of a clay mineral; a grinding step for grinding the roll surface of the roll part; a surface treatment step for conducting a surface treatment in which the ground roll surface is smoothed in a moisturized state; and a clay coating film forming step for forming a coating film of a clay mineral on the surface-treated roll surface.

In a second preferred embodiment, there is provided a method for producing a heat-resistant roll according to the first embodiment, wherein the swelling power of the clay mineral covering the surface is 15 ml/2 g or more.

In a third preferred embodiment there is provided a method for producing a heat-resistant roll according to one of the prior embodiments, wherein the clay mineral covering the surface is one or more selected from bentonite, Kibushi clay and kaolin.

In accordance with a fourth embodiment, there is provided a method for producing a heat-resistant roll according to any one of the prior embodiments, wherein, in the clay coating film forming step, a clay mineral-containing liquid is adhered to the surface-treated roll surface, followed by drying, thereby to form a coating film of the clay mineral.

In accordance with a fifth embodiment there is provided a method for producing a heat-resistant roll comprising: a roll part fabricating step for fabricating a roll part comprising 5 wt % or more of a clay mineral; a grinding step for grinding the roll surface of the roll part; and a surface treatment step for conducting a surface treatment in which the ground roll surface is smoothed in a state moisturized with a clay mineral-containing liquid, whereby a coating film of the clay mineral is formed on the roll surface.

In accordance with a sixth embodiment, there is provided a method for producing a heat-resistant roll according to any one of the prior embodiments, wherein the surface treatment step comprises a first step of moisturizing the ground roll surface and a second step of smoothing the moisturized roll surface.

In accordance with a seventh embodiment there is provided a method for producing a heat-resistant roll according to the sixth embodiment, wherein in the second step, the roll surface is smoothed by rotating the roll part while pressing a member against the wet roll surface.

In accordance with an eighth embodiment, there is provided a method for producing a heat-resistant roll according to any one of the prior embodiments, wherein in the surface treatment step, the surface treatment is conducted by pressing a moisturized member against the roll surface of the roll part that is rotating.

In accordance with a ninth embodiment, there is provided a method for producing a heat-resistant roll according to any one of the prior embodiments, wherein the amount of the clay mineral forming the coating film is 0.1 g or more in terms of solid matter per 1 $m^2$ of the average surface area.

In accordance with a tenth embodiment, there is provided a heat-resistant roll wherein a surface part of a roll part containing 5 wt % or more of a clay mineral is covered by a clay mineral.

In accordance with an eleventh embodiment, there is provided a heat-resistant roll according to the tenth embodiment, wherein the surface part of the roll part is densified as compared with the inside of the roll part.

In accordance with a twelfth embodiment, there is provided a heat-resistant roll that is produced by the method according to any one of first through ninth embodiments.

in accordance with a thirteenth embodiment, there is provided a heat-resistant roll according to any one of tenth through twelfth embodiments, wherein the amount of the clay mineral forming the coating film is 0.1 g or more in terms of solid matter per 1 $m^2$ of the average surface area.

In accordance with a fourteenth embodiment, there is provided a method for producing plate glass wherein the heat-resistant roll according to any one of 10 to 13 is used as a conveyance roll.

According to the invention, it is possible to provide a heat-resistant roll in which dusting from the surface of the roll part is suppressed, a production method thereof and a plate glass production method using the same.

MODE FOR CARRYING OUT THE INVENTION

Hereinbelow, an explanation will be given with reference to the drawings on the heat-resistant roll according to an exemplified embodiment of the invention, the production method thereof and the plate glass production method using the same. In this embodiment, an explanation is mainly made on an example in which the heat-resistant roll according to the invention is a disk roll having a plurality of disks being stacked. However, the invention is not limited to this embodiment.

Figure 1:
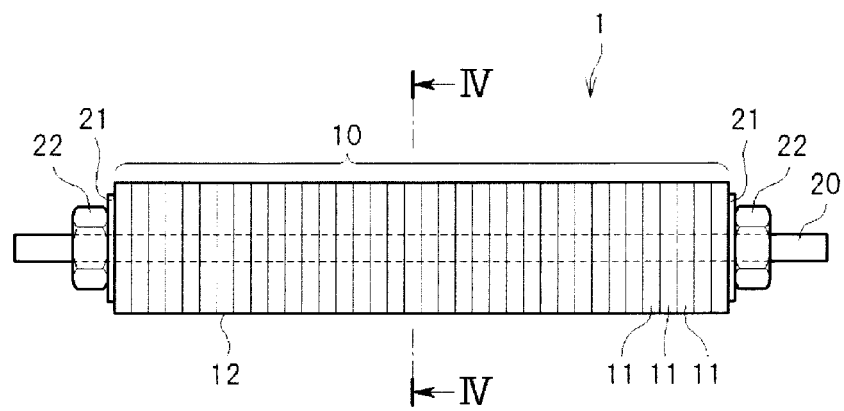
FIG. 1 is an explanatory view showing one example of a heat-resistant roll according to one embodiment of the invention.

First, an explanation will be given on the outline of the disk roll according to this embodiment and the plate glass production method using the disk roll. FIG. 1 shows one example of a disk roll 1. As shown in FIG. 1, the disk roll 1 has a cylindrical roll part 10 that extends in the longitudinal direction thereof.

The roll part 10 is formed of a plurality of disks 11 each containing 5 wt % or more of a clay mineral (hereinafter often referred to as "clay") being stacked in the longitudinal direction of the roll part 10. That is, the disks 11 constituting the roll part 10 are inserted into an shaft part 20 that serves as a rotational shaft of the disk roll 1.

In the invention, the surface of the roll part 10 is further covered by a clay mineral. The clay mineral that constitutes the entire roll part 10 by uniform dispersion and the clay mineral that covers that surface of the roll part 10 may be the same as or different from each other.

The disks 11 being stacked are fixed by means of a flange 21 and a nut 22 provided at the both ends of the shaft part 20 in the state where they are compressed in the longitudinal direction of the shaft part 20. Therefore, the surface of the roll part 10 (hereinbelow referred to as the "roll surface 12") is formed of the sequential outer circumferential surfaces of the disks 11 being stacked in the compressed state.

The structure of the disk roll is not limited to one shown in FIG. 1 in which the entire shaft is covered by disks. For example, as the structure of the disk roll, a structure in which a part of the shaft where glass contacts is covered by disks, a structure in which a single shaft is provided, a structure in which the disk part is detachable, or the like, can be given.

Figure 2:
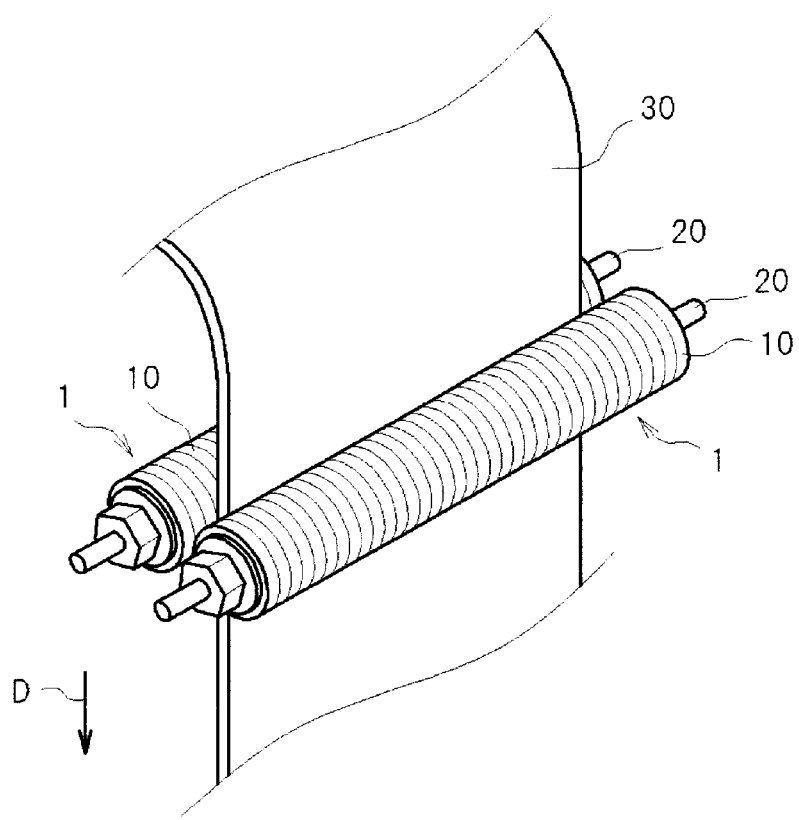
FIG. 2 is an explanatory view showing one example of production of plate glass using the heat-resistant roll shown in FIG. 1.

In the production of plate glass, this glass roll 1 can be used as a conveyance roll. FIG. 2 shows one example of the disk roll 1 that is used as a conveyance roll in the production of plate glass. As shown in FIG. 2, in a production apparatus of plate glass (not shown), a pair of disk rolls 1 being arranged in parallel are installed rotatably around the shaft part 20 thereof. The disk roll 1 may be connected to a driving power generation apparatus (not shown). In this case, the disk roll 1 can be rotated by driving power generated by the driving power generation apparatus.

The glass ribbon 30 sent from the upstream of a conveyance passage in the molten state is conveyed to the downstream while being held between a pair of the roll part 10 that rotates. That is, in the example shown in FIG. 2, the glass ribbon 30 is conveyed in the vertically downward direction (direction indicated by an arrow D in FIG. 2). The plate-shaped glass can be produced by a floating method, a roll-out method, a Colbum method or the like in addition to the above-mentioned down draw method.

By conveying by the disk roll 1, the glass ribbon 30 is cooled slowly. FIG. 2 shows only a pair of the disk rolls 1. It is possible to install two or more pairs of disk rolls 1 along to the conveyance passage.

The disk roll 1 can be used as a pulling roll that applies tension to the glass ribbon 30 in order to adjust the nominal thickness of plate glass to be produced. The nominal thickness of plate glass can be adjusted by changing a speed at which the pulling roll pulls the glass ribbon 30

In the production of plate glass, the roll surface 12 that contacts the glass ribbon 30 is required to have heat resistance to withstand a temperature that is equal to or higher than the melting temperature of glass, spalling resistance to allow the roll to be taken out immediately when production line troubles occur, flexibility to prevent the glass ribbon 30 that contacts from being scratched, durability to withstand high temperatures for a long period of time and low dusting properties not to contaminate the glass ribbon 30.

Here, the heat-resistant roll of the invention is a roll having a heat shrinkage measured by the method described in the Examples of 1% or less.

Next, an explanation will be given on the production method of the disk roll 1 having such excellent characteristics.

According to one embodiment of the invention, first, the disk roll 1 is assembled by using the disks 11. In the production of the disk 11, an aqueous slurry is prepared at first, and a plate (so-called mill board) having a predetermined thickness is produced from the aqueous slurry.

The aqueous slurry is prepared to have a composition that conforms to a composition of the disk 11 finally produced. That is, this aqueous slurry contains a clay mineral in an amount required to attain a content of 5 wt % or more in the disk 11 mounted in the disk roll 1.

As the clay mineral, one having properties of being sintered by heating can be preferably used. One clay mineral can be used singly or two or more clay minerals can be used in combination. Specifically, for example, refractory clay such as Kibushi clay or potter's clay, bentonite and kaolin can be used. The refractory clay can preferably be used. Among these, Kibushi clay is preferable due to excellent binding effects by sintering and a small amount of impurities.

The aqueous slurry can further contain inorganic fiber or a filler. As the inorganic fiber, no specific restrictions are imposed as long as it can be used as reinforcing materials that increase the strength of the disk 11, and arbitrary inorganic fiber can be selected and used appropriately. One type of inorganic fiber can be used singly or two or more types of inorganic fiber can be used in combination.

That is, artificial inorganic fibers such as ceramic fibers, glass fibers and rock wool fibers can be preferably used. More specifically, alumina fibers, mullite fibers, silica/alumina fibers and silica fibers, which have excellent heat resistance, can be used particularly preferably.

No specific restrictions are imposed on the filler as long as it can contribute to improvement in properties, such as heat resistance and strength, of the disk 11, and an arbitrary filler can be selected and used appropriately. One filler can be used singly or two or more fillers can be used in combination. That is, an inorganic filler such as mica, wollastonite, sepiolite, silica, alumina, cordierite and calcined kaoline can be used. Among these, mica that shows excellent properties such as high elasticity, sliding properties, wear resistance, heat resistance or the like can preferably be used. Further, scaly silica or scaly alumina can use used. Among them, scaly silica is preferable due to its high wear resistance. Scaly silica is preferably a secondary aggregate in which primary scaly silica pieces are overlapped in parallel or a tertiary aggregate in which a plurality of the secondary aggregates are aggregated. Specifically, the scaly silica is foliar silica secondary particles formed of a plurality of flaky primary particles of scaly silica which are overlaid one on another and aligned face-to-face in parallel with one another. The foliar silica secondary particles may be aggregated further three-dimensionally to form tertiary particles. As for the foliar silica secondary particles and tertiary particles, a statement is made in JP-A-2006-143666, JP3795671 or the like.

The aqueous slurry may further contain an aid for improving the properties such as formability. As the aid, an inorganic material or an organic material that can be removed from the disk 11 by calcining the disk 11 can be used, for example. As the organic material, an organic binder such as pulp, starch and fibers and particles of synthetic resins can be used.

The aqueous slurry prepared as a mixture of these materials is formed into a plate-like shape, followed by drying, thereby to form a mill board. Forming of a mill board can be conducted more preferably by a paper-making method using a paper-making machine. The thickness of a mill board can be set to a desired value corresponding to the thickness of the disk 11. For example, the thickness may be in a range of 2 to 30 mm.

Then, circular disks are punched from the mill board to obtain the disk 11. In the middle of the disk 11, a through hole through which the shaft part 20 is inserted at the time of assembling is formed.

The disk 11 may be one obtained by sintering after punching a mill board, or may be one obtained by punching a mill board for which no sintering is conducted. After assembling the disk roll 1 having the disks 11, the roll part 10 containing the disks 11 can be sintered. Further, the roll part 10 can be sintered after being subjected to a surface treatment in a surface treatment step S20 mentioned later. The sintering conditions are not particularly restricted, and can be appropriately changed in accordance with the specification of a sintering furnace and conditions such as the bulk density or size of the disk 11. That is, although the sintering temperature is not particularly restricted, it can be set in a range of 300 to 1000° C., for example, preferably in a range of 400 to 900° C., and more preferably 500 to 800° C. The sintering time is not particularly restricted, and can be in a range of 1 to 24 hours.

When producing a sintered disk 11, it is possible to remove the aids such as organic materials, etc. contained in a mill board by the sintering. As a result, a disk 11 formed of sintered inorganic materials is obtained. In the disk 11 after sintering, gaps derived from burning off of part of the materials accompanied by the sintering are formed.

The disk 11 can be produced by molding. That is, the disk 11 can be produced by the following process, for example. Specifically, a slurry prepared as a mixture of the above-mentioned materials is flown into a mold having a predetermined shape corresponding to the shape of the disk 11, followed by suction dehydration molding. Alternatively, clay slurry is impregnated on the surface of a disk obtained by molding, followed by drying, whereby the disk 11 containing the clay mineral can be produced.

The disk 11 obtained by molding can be sintered. The sintering conditions such as the sintering method, the timing of sintering, the sintering temperature and the sintering time are the same as mentioned above.

The thus obtained disk 11 (the disk 11 after sintering if sintering is conducted) contains 5 wt % or more of a clay mineral. The content of this clay mineral is further preferably 10 wt % or more and more preferably 15 wt % or more.

The upper limit of the content of a clay mineral can be appropriately set in accordance with the properties required for the disk roll 1. That is, the content of a clay mineral is preferably 50 wt % or less, for example, more preferably 45 wt % or less. If the content of a clay mineral is large, in the roll part 10, problems such as breakage, formation of cracks and separation of the disks 11 tend to occur, and as a result, the disk roll 1 cannot fully exhibit its performance.

Therefore, the content of a clay mineral in the disk 11 can be in a range of 5 to 50 wt %, for example. The content can be preferably 10 to 30 wt %, with 10 to 43 wt % being more preferable.

It is preferred that Kibushi clay and bentonite be contained as a clay mineral. The content of each of these is preferably 5 to 30 wt %, more preferably 7 to 25 wt % and further preferably 8 to 23 wt %.

The amount of the inorganic fiber or the filler contained in the disk 11 can be appropriately set in accordance with the type of these materials or the properties required for the disk roll 1. That is, the content of the inorganic fiber is preferably 20 to 50 wt %, further preferably 25 to 45 wt %, and further preferably 30 to 43 wt %.

The content of the filler is preferably within a range of 5 to 50 wt %, more preferably 7 to 40 wt %, with 10 to 35 wt % being more preferable.

The clay mineral, the inorganic fiber, the filler and the organic binder may constitute 90% or more, 95% or more, 98% or more or 100% of the disk roll.

A plurality of the thus produced disks 11 are inserted into the shaft part 20 in sequence. Further, the disks 11 are compressed in the longitudinal direction of the shaft part 20 by hydraulic pressing or the like. Then, the disks 11 in the compressed state are disposed between a pair of flanges 21 provided at the both ends of the shaft part 20, and further fixed by means of a pair of nuts 22. It is also possible to fix, by the flange 21 and the nut 22, the disks 11 that have been inserted into the shaft part 20 without compressing.

In the above-mentioned way, the disk roll 1 provided with the roll part 10 that is composed of the disks 11 being stacked can be assembled. By fixing by compressing the disks 11 constituting the roll part 10, it is possible to allow the roll part 10 to be hard and dense as compared with the disks 11 before assembly.

The roll part 10 is not limited to the above-mentioned roll part composed of the disks 11 being stacked. That is, the roll part 10 may be one cylindrical formed body containing 5 wt % or more of a clay mineral. The roll part 10 may be one in which a plurality of cylindrical formed bodies containing 5 wt % or more of a clay mineral are stacked along the shaft part 20.

Such cylindrical formed body can be produced by molding materials containing the above-mentioned inorganic materials as a main component. In this case, the roll part 10 is produced as a cylindrical formed body by a method in which a slurry prepared as a mixture of the above-mentioned raw materials is flown to a mold having a prescribed shape corresponding to the shape of the roll part 10, followed by suction dehydration forming. In this case, a clay mineral may be contained in a slurry before molding. Further, the surface of the cylindrical formed body obtained by f molding is impregnated with a clay slurry, followed by drying, whereby the roll part 10 containing the clay mineral can be produced.

The roll part 10 can be an inorganic fiber formed body in which a clay mineral is contained between fibers. That is, the roll part 10 can be produced by winding once or plural times a sheet-like inorganic fiber formed body containing a clay mineral between fibers around the shaft part 20.

In this case, the roll part 10 can be produced by impregnating the inorganic fiber formed body with a clay slurry, for example. Specifically, for example, inorganic fiber paper is impregnated with a clay slurry, and the inorganic fiber paper is wound around the shaft part 20, whereby the roll part 10 can be produced. Further, for example, a slurry containing a clay mineral is subjected to paper making, thereby to produce inorganic fiber paper containing the clay mineral, and the roll part 10 can be produced by using the inorganic paper. Then, by utilizing the inorganic fiber paper, the roll part 10 can be produced. Alternatively, for example, an inorganic fiber blanket is wound around the shaft part 20, and the inorganic fiber blanket is impregnated with a clay slurry, followed by drying to produce the roll part 10.

These cylindrical formed body or the inorganic fiber formed body can be sintered. Further, after assembling the roll part 10 having the disks 11, the cylindrical formed body or the inorganic fiber formed body, the roll part 10 may be sintered. After subjecting the roll part 10 to a surface treatment in a surface treatment step S20 mentioned later, the roll part 10 can be sintered. In these cases, sintering conditions are not particularly restricted, and can be appropriately changed in accordance with conditions such as the specification of a sintering furnace, the bulk density, the size or the like of the cylindrical formed body or the inorganic fiber formed body. As for the sintering temperature and the sintering time, the same mentioned above can be applied.

Figure 3:
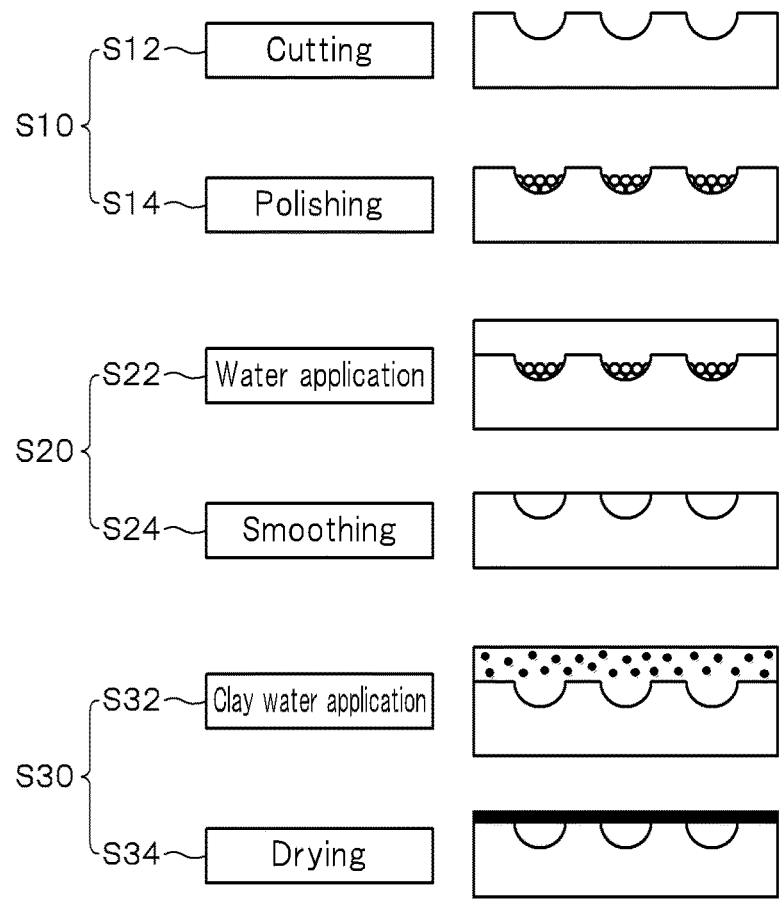
FIG. 3 is a schematic view showing main steps included in the production method of a heat-resistant roll according to a first embodiment of the invention.

Hereinbelow, the surface finishing of the thus produced roll will be explained with reference to the drawings. FIG. 3 shows main steps included in the first embodiment of the production method of the invention. At the right of the figure, the state of the surface is schematically shown.

First, in the grinding step S10, the roll surface 12 of the disk roll 1 assembled in the assembling step is ground. That is, by grinding part of the roll surface 12 in the dry state, the roll surface 12 is smoothed and the diameter of the roll part 10 is adjusted. For example, as shown in FIG. 1, the diameter in the longitudinal direction of the roll part 10 can be adjusted to be a constant value.

In this embodiment, the grinding step S10 includes a cutting step S12 and a polishing step S14.

First, by cutting the roll surface 12 by means of a cutting apparatus such as a lathe, relatively a large unevenness on the roll surface 12 is removed (cutting step S12). However, as shown in the right of the figure, a slight unevenness still remains on the surface.

Next, the roll surface 12 is further polished by a polishing tool such as sandpaper to allow it to be flattened (polishing step S14). At this time, as shown in the right side of the figure, fine particles generated by polishing enter the concave.

Further, the grinding step S10 can be conducted in a single step of cutting and polishing, without dividing it into the cutting step S12 and the polishing step S14. According to the state of the roll surface, any one of the cutting and the polishing may be omitted.

Subsequently, in the surface treatment step S20, a surface treatment is conducted such that the roll surface 12 that has been cut in the cutting step S10 is smoothed in a moisturized state. In this embodiment, in the surface treatment step S20, water is applied to the roll surface 12 in the dry state after grinding (water application step S22).

In this embodiment, water is used. No specific restrictions are imposed as long as it is a liquid that can be impregnated in the roll surface 12 and does not contain a solute, and any liquid can be selected and used appropriately. One type of a liquid can be used singly or two or more types of a liquid can be used in combination. That is, a polar solvent such as water, ethanol and acetone can be preferably used, for example. Among them, water is particularly preferably used since it is easy to handle and can plasticize a clay mineral effectively.

A liquid is not necessarily be applied and may be sprayed by means of a spraying tool such as a sprayer.

The roll surface 12 can be plasticized by moisturizing. That is, fine particles constituting the roll surface 12 are hardened and strongly bound in a dry state, but are softened in a wet state to allow deformation or moving to be conducted relatively easily.

In this surface treatment step S20, an external force is further applied to the wet roll surface 12 to smooth the roll surface 12 (smoothing step S24). That is, for example, by rubbing the moisturized roll surface 12, shear force is applied in the direction along the roll surface 12.

As a result, part of the fine particles constituting the roll surface 12 can be moved along the roll surface 12. As a result, the degree of unevenness on the roll surface 12 can be reduced.

That is, as shown in the right side of the figure, by moving, along the roll surface 12, the fine particles constituting convex parts of the roll surface 12 and allowing them to be embedded in concave parts, the roll surface 12 can be smoothed.

By applying a force to press the roll surface 12, the fine particles constituting the roll surface 12 can be filled more densely. That is, in the wet roll surface 12, the fine particles can be moved while shifting their positions. As a result, by application of an appropriate pressing force, the fine particles can be re-arranged and re-filled such that they can be in a more uniform dispersion state, whereby the roll surface 12 can be dense.

The water application step S22 and the smoothing step S24 can be conducted while rotating the roll part 10.

The surface treatment step S20 may be conducted in a single step where the moisturizing with water and smoothing are conducted simultaneously without dividing it into the water application step S22 and the smoothing step S24.

Figure 4:
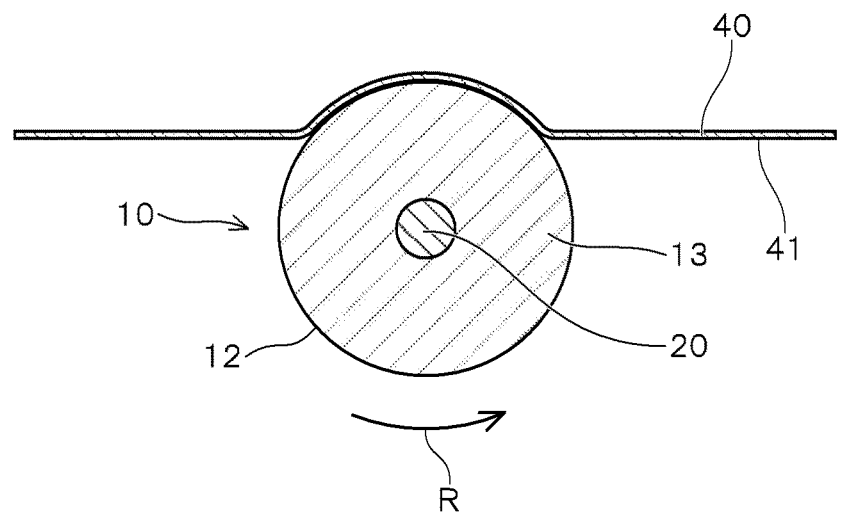
FIG. 4 is an explanatory view showing one example of a surface treatment using a member in the production method of a heat-resistant roll according to a first embodiment of the invention.

The surface treatment step S20 can be conducted by using a member as shown in FIG. 4.

FIG. 4 shows one example of preferred embodiments for realizing the above-mentioned surface treatment. FIG. 4 shows a cross section of the roll part 10 of the disk roll 1 shown in FIG. 1 taken along line IV-IV and a cross section of the member 40 used for the surface treatment of the roll part 10.

As shown in FIG. 4, in this example, by pressing the member 40 against the roll surface 12 that is rotating, the surface treatment mentioned above is conducted. That is, the roll part 10 is rotated around the shaft part 20 in the direction indicated by an arrow R shown in FIG. 4.

Then, the member 40 is pressed against the rotating roll surface 12, and the state is maintained. At this time, as shown in FIG. 4, it is preferred that the member 40 be arranged along the roll surface 12. FIG. 4 shows only a state in which the member 40 is arranged along the circumferential direction of the roll surface 12. However, the member 40 can be arranged along the longitudinal direction of the roll surface 12. In this way, it is possible to rotate the roll surface 12 in a state it is in contact with the member 40.

As the member 40, a sheet-like member 40 can be preferably used, for example.

In the water application step S22, the member 40 that has been moisturized in advance with a liquid can be brought into contact with the roll surface 12.

In the smoothing step S24, the roll part 10 is rotated while pressing the sheet-like member 40 against the wet roll surface 12, whereby the member 40 is arranged along the circumferential direction of the roll surface 12. As a result, the roll surface 12 is smoothed.

As the member 40, a sheet-like member 40 in which unevenness for polishing is formed on the surface that contacts the roll surface 12 such as a sandpaper can be preferably used. By using the member 40 having a polishing ability, as mentioned above, it is possible to realize movement and re-filling of fine particles constituting the roll surface 12.

Further, as shown in FIG. 4, a member 40 that is flexible enough to be arranged on the roll surface 12 can be preferably used. Specifically, a sheet-like fibrous member such as woven fabrics and non-woven fabrics or a sheet-like porous member made of a synthetic polymer having flexibility (e.g. foamed formed body) can be preferably used. Further, as mentioned above, a sheet-like member 40 in which unevenness for polishing is formed on the surface thereof (e.g. sandpaper) can be preferably used.

The surface treatment step S20 can be conducted such that the roll surface 12 of the roll part 10 that rotates in one direction of the circumferential direction is subjected to the above-mentioned surface treatment, and then the rotation direction of the roll part 10 is switched to the reverse direction, and the above-mentioned surface treatment is conducted. This repeating process can be conducted once or more.

That is, in this case, while rotating the roll part 10 in one direction of the circumferential direction (e.g. a direction indicated by an arrow R shown in FIG. 4), a surface treatment is conducted in which the roll surface 12 is smoothed in a moisturized state. This surface treatment may be conducted in two stages, i.e. moisturizing is conducted at first, followed by smoothing.

Subsequently, without drying the roll surface 12 after the surface treatment, the rotation direction of the roll part 10 is switched to a reverse direction, and a treatment is conducted repeatedly. That is, in a repeated treatment, while the roll part 10 is rotated in another direction of the circumferential direction (e.g. in a direction opposite to the direction indicated by an arrow R shown in FIG. 4), a surface treatment is conducted in which the roll surface 12 is smoothed in a moisturized state.

Further, when a second repeated treatment is conducted, without drying the roll surface 12 after the above-mentioned first repeated treatment, the rotation direction of the roll part 10 is again switched to a reverse direction, and the second repeated treatment is conducted. That is, in this second repeated treatment, while rotating the roll part 10 in one direction of the circumferential direction, a surface treatment is conducted in which the roll surface 12 is smoothed in a moisturized state.

When a repeated treatment is conducted three or more times, similarly, the rotation direction of the roll part 10 is switched and the roll surface 12 of the roll part 10 that rotates in a direction that has been switched is subjected to a surface treatment. The surface treatment in the repeated treatment may be conducted in two stages as mentioned above.

In the surface treatment step S20, no specific restrictions are imposed on the pressing force that is applied to the roll surface 12 in order to smooth the roll surface 12. A pressing force can be arbitrarily set within a range that allows the roll surface 12 to be smooth and dense as mentioned above.

That is, as mentioned above, when the roll surface 12 is smoothed by pressing the member 40 (e.g. a sheet-like member 40 having polishing performance such as sandpaper) against the roll surface 12, it is possible to apply a pressing force in a range of 100 to 2000 N per unit length (1 mm) (e.g. a pressing force in a range of 100 to 2000 N/mm) in the width direction (the longitudinal direction of the shaft part 20) of the member 40.

In the surface treatment step S20, the speed of rotating the roll surface 12 when smoothing the roll surface 12 is not particularly restricted. The speed can be arbitrarily set in a range that attains the smoothing and densification of the roll surface 12 as mentioned above.

The rotational speed of the roll part 10 can be in a range of 10 to 1500 rpm, for example. Further, the circumferential speed of the roll surface 12 can be in a range of 1 to 1000 m/min, for example.

If the surface treatment step S20 is conducted in a single step, the roll surface 12 is smoothed by using a member 40 that has been moisturized in advance, whereby a surface treatment is conducted.

If the member 40 is used after incorporating water, a fibrous member or a porous member that can retain a liquid such as water can be used, for example. Specifically, when a surface treatment is conducted by using water, a water-containing fibrous member or a porous member that can contain water therein can preferably be used.

If the roll surface 12 is rotated in a state where the moisturized member 40 is arranged along the roll surface 12, since the wet member 40 covers part of the roll surface 12, it is possible to moisturize the roll surface 12 efficiently due to gradual release of a liquid (water) from the member 40, and at the same time, the roll surface 12 that has moisturized once is efficiently prevented from being dried again.

Subsequently, in a clay coating film forming step S30, clay water is applied to the roll surface 12 that has been subjected to the above-mentioned surface treatment (clay water application step S32). Then, the roll surface is dried (drying step S34). Drying may be natural drying, but can be conducted by means of a dryer. By doing this, a coating film of a clay mineral is formed, and unevenness that cannot be smoothed only by the surface treatment step S20 can be smoothed. As a result, dusting can be suppressed.

As the clay mineral, one having a swelling power of 15 ml/2 g or more can be used, preferably 20 ml/2 g or more, and further preferably 30 ml/2 g or more. For example, refractory clay such as Kibushi clay and potter's clay, bentonite and kaolin can be used.

The swelling power can be measured in accordance with the Japan Bentonite Manufacturer's Association Standard Testing method (JBAS-104-77). Specifically, the swelling power can be measured by the following method. 2 g of a sample is accurately weighed, and added to a 100 ml-graduated cylinder provided with a stopper accommodating 100 ml of purified water. At this time, care should be taken not to allow the sample to adhere to the inner wall of the cylinder. Further, the sample is added in several portions and added in such a manner that a next portion is added after most of a previously added portion sediments. After adding all of the sample, the cylinder is capped. After allowing to stand for 24 hours, the volume A (ml) of matters deposited in the lower part of the graduated cylinder is read out. The value thus read is a swelling power (ml/2 g).

As the clay water used for application, one obtained by dissolving or dispersing 1 to 1000 g of a clay mineral in 10 L of water can be used.

In this embodiment, water is used. No specific restrictions are imposed as long as it can dissolve or disperse appropriately a clay mineral, and an arbitrary type of a liquid can be selected and used appropriately. One type of a liquid can be used singly or two or more types of liquids can be used in combination. In respect of easiness in handling, water is preferable.

For the amount of coating film, the average film thickness of a coating film is preferably about 0.01 mm to 5 mm. The coating film can be further thick. Alternatively, the amount of coating film may be in sold content about 0.1 g to 1000 g, preferably 0.1 to 100 g, and more preferably 0.3 to 50 g, per 1 $m^2$ of the average surface area.

A coating film is not necessarily cover the entire surface. A coating film may cover preferably 80% or more, more preferably 90% or more, and most preferably 100% of the entire surface.

A clay mineral liquid is applied to the roll surface 12 by a spraying method, immersion, brushing, dripping or other methods, for example.

Figure 5:
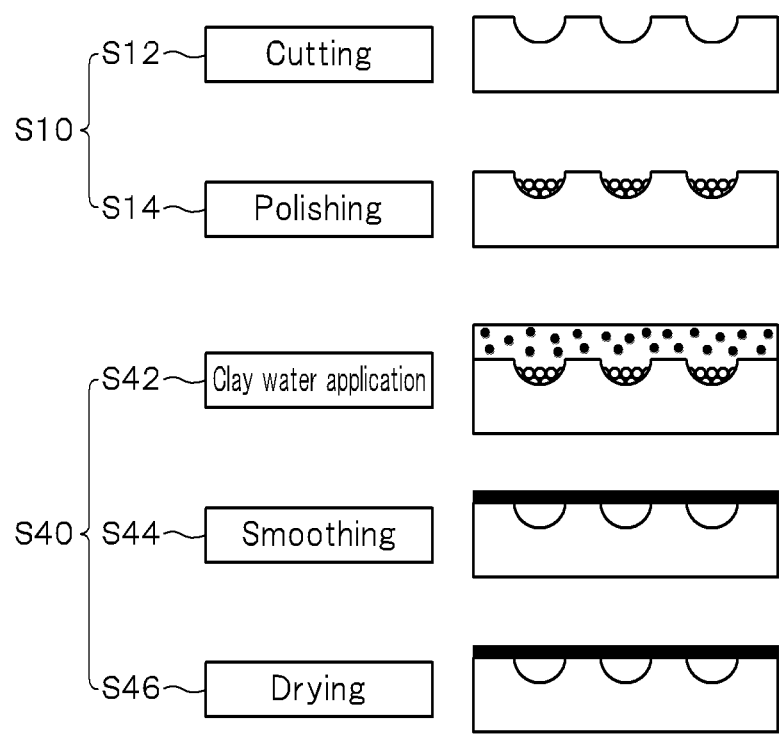
FIG. 5 is a schematic view showing main steps included in the production method of a heat-resistant roll according to a second embodiment of the invention.

FIG. 5 shows main steps included in the second embodiment of the invention. At the right of the figure, the state of the surface is schematically shown.

In this embodiment, after the grinding step S10, the clay-containing water used in the first embodiment is applied instead of applying water (surface treatment step S40). The grinding step S10 is the same as that in the first embodiment, and hence, an explanation is omitted.

In this embodiment, a clay-containing water is applied (clay water application step S42), smoothed and dried (smoothing step S44 and drying step S46). Thereafter a coating film of a clay mineral is formed in the same manner as in the first embodiment. In this step, as shown in the right side of the figure, a shear force is applied in a direction along the surface 12, thereby allowing part of fine particles constituting the roll surface 12 to move along the roll surface 12 to reduce unevenness on the roll surface 12; and at the same time, the clay mineral contained in the clay water also enters and fills the concave part of the surface 12, and further, a clay coating film is formed thereon. Therefore, unevenness that cannot be fully smoothed by the surface treatment step S20 using only water as in the first embodiment can be smoothed. As a result, dusting can be suppressed.

In the thus obtained disk roll 1, the roll surface 12 is dense as compared with the inside 13 of the roll part 10. That is, in the roll part 10, surface parts including the outer surface and the vicinity of the outer surface with a prescribed thickness is dense locally.

In the second embodiment, the step in which clay water is again adhered and dried (clay coating film formation step S30), as conducted in the first embodiment, is not required. However, as in the first embodiment, a coating film of a clay mineral may further be formed (clay coating film formation step S30 is conducted), thereby to increase the thickness.

In the surface 12 of the heat-resistant roll of the invention, dusting is suppressed and smoothed. Further, due to the presence of a clay mineral coating film, the surface has a high strength.

The arithmetic surface roughness of the roll surface 12 measured by a method stipulated by JIS B 0601-1994 can be 5.0 μm or less, more preferably 3.0 μm or less, and particularly preferably 1.0 μm or less.

The maximum height Ry of the roll surface 12 measured by the method stipulated by JIS B 0601-1994 can be 25.0 μm or less, more preferably 15.0 μm or less, and particularly preferably 10.0 μm or less.

The 10-point average roughness Rz of the roll surface 12 that is measured by a method stipulated by JIS B 0601-1994 can be 25.0 μm or less, more preferably 15.0 μm or less, and particularly preferably 10.0 μm or less.

As for the roll surface 12, at least one of the arithmetic surface roughness Ra, the maximum height Ry and the 10-point average roughness Rz is preferably within the above-mentioned range. It is particularly preferred that all of these three be in the above-mentioned range.

The roll part 10 of the heat-resistant roll obtained in the invention can maintain equivalent properties (e.g. heat resistance) before and after the above-mentioned surface finishing.

EXAMPLES

Example 1 and Comparative Example 1

From a base material for a disk roll, disks having an outer diameter of 60 mm and an inner diameter of 20 mm were punched out. The disks were roll-built to a stainless-made shaft having a diameter of 20 mm such that the length became 100 mm and the mounted density became 1.35 g/$cm^3$, whereby the disk roll 1 shown in FIG. 1 was fabricated.

This disk 11 contained 10 wt % of Kibushi clay, 10 wt % of bentonite, 40 wt % of mullite fibers as inorganic fibers and 32 wt % of mica as a filler. The base material for a disk roll contained 6 wt % of pulp as an aid and 2 wt % of an organic binder.

The thus assembled disk roll 1 was sintered. The pulp and the organic binder contained in the disk 11 were burned off by this sintering.

Subsequently, the roll surface 12 of this disk roll 1 was ground. The grinding was conducted by a method in which the disk roll 1 was mounted in a prescribed driving apparatus, rotated around the shaft part 20, and sandpaper was brought into contact with the rotating roll surface 12.

Simultaneously with the grinding, dust-free paper (Kim-Wipe, manufactured by Nippon Paper Crecia Co., Ltd.) that had been moisturized in advance by impregnation of water was pushed against the rotating roll surface 12, and held for a prescribed period of time, whereby a surface treatment for smoothing the roll surface 12 in a moisturized state was conducted.

The roll surface 12 after the surface treatment was dried by heating.

An aqueous solution of bentonite was applied by spraying and brushing to the roll surface 12 that had been subjected to the surface treatment, thereby to conduct a coating treatment. The aqueous bentonite solution was prepared by dissolving 50 g of bentonite in 10 L of water. Thereafter, the roll surface 12 was naturally dried to produce the disk roll 1.

As Comparative Example 1, a disk roll that had been subjected to the above-mentioned surface treatment, but had not been subjected to the coating treatment was prepared.

For each of the disk roll 1 and the disk roll that had not been subjected to the coating treatment, the following properties were evaluated. The results are shown in Table 1.

(1) Heat Shrinkage (Heat Resistance)

After heating the disk roll at 900° C. for 3 hours, the length in the longitudinal direction of the roll was measured, and the heat shrinkage was evaluated based on the following formula:

[(Measured value before heating−Measured value after heating)/Measured value before heating]×100

(2) Spalling Resistance (Heat Resistance)

The disk roll was put in an electric furnace of which the temperature was retained at 900° C. After the lapse of 15 hours, the disk roll was taken out and quenched to room temperature (25° C.). This cycle of heating and quenching was repeated until a crack or disk separation of the disk roll occurred. The number of cycles in which a crack or disk separation occurred was counted.

(3) Flexibility (Deformation Under Load)

The both ends of the shaft of the disk roll were supported by a stand, and a pressure was applied to the roll surface composed of the disks at 8.82 N/mm by means of a compression element, and the amount of deformation at this time was measured.

(4) Durability (Hot Abrasion Test)

From the base material for a disk roll containing ceramic fibers, disks having an outer diameter of 80 mm and an inner diameter of 30 mm were punched out, and the disks were roll-built to a stainless-made shaft having a diameter of 30 mm such that the length became 100 mm and the mounted density became 1.25 g/cm$^3$.

In a state where the roll surface of this disk roll was in contact with a stainless-made shaft having a diameter of 30 mm on which 5 grooves (width: 2 mm) were provided at an interval of 2 mm, the disk roll was rotated at 900° C. for 5 hours. Then, the disk roll was cooled to room temperature (25° C.), and the depth of the groove formed on the roll surface of the disk roll was measured.

(5) Dusting Properties

Dusting properties were evaluated by a method mentioned below. Specifically, the roll surface was rubbed against black drawing paper, and the weight of powder attached to the drawing paper was measured, and the brightness of the drawing paper was measured with a colorimeter.

Plate glass was actually produced by using the above-mentioned disk roll. Significant difference in dusting properties could be found.

(6) Surface Roughness

By using a stylus type surface roughness tester (JIS B 0651), according to a method stipulated by JIS B 0601-1994, the arithmetic surface roughness Ra, the maximum height Ry and the 10-point average roughness Rz were measured.

TABLE 1

| | | | Example 1 | Comp. Ex. 1 |
|---|---|---|---|---|
| Heat resistance | Heat shrinkage | % | 0.1 | 0.1 |
| | Spalling test | Number of times | 10 | 10 |
| Flexibility | Deformation under load | mm | 0.21 | 0.21 |
| Durability | Hot abrasion test | mm | 0.2 | 0.2 |
| Dusting properties | Amount of dusting | mg/cm$^2$ | 0.04 | 0.05 |
| | Brightness index L | — | 29.63 | 30.57 |
| Smoothness | Arithmetic mean roughness | μm | 0.63 | 0.85 |
| | Maximum height | μm | 4.50 | 6.02 |
| | 10-point average roughness | μm | 3.15 | 4.26 |

INDUSTRIAL APPLICABILITY

The disk roll obtained by the production method of the invention can be used for production of plate glass, in particular, glass for liquid crystals or glass for plasma displays.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The specification of a Japanese application on the basis of which the present application claims Paris Convention priority is incorporated herein by reference in its entirety.

The invention claimed is:

1. A heat-resistant roll comprising:
   a roll part that comprises disks, a cylindrical formed body or an inorganic fiber formed body; and
   a clay coating film that covers a surface of the roll part and the clay coating film being formed as a separate layer on the outer exterior surface of the roll part, wherein
   a clay mineral contained in clay water enters and fills a concave part of unevenness on the outer exterior surface, and the clay coating film adheres to the outer exterior surface,
   a smoothness represented by a maximum height Ry of a surface of the clay coating film is 4.50 μm or less,
   an arithmetic surface roughness Ra of the surface of the clay coating film is 5.0 μm or less, and a 10-point average roughness Rz of the surface of the clay coating film is 25.0 μm or less
   an amount of dusting is less than 0.05 mg/cm$^2$,
   the disks, the cylindrical formed body or the inorganic fiber formed body comprises 5 to 50 wt % of a clay mineral uniformly, 20 to 50 wt % of an inorganic fiber and 5 to 50 wt % of a filler, and
   the clay coating film covers 80% or more of an entire outer exterior surface of the roll part.

2. The heat-resistant roll according to claim 1, wherein the surface part of the roll part is densified as compared with an inside of the roll part.

3. The heat-resistant roll according to claim 1, wherein the amount of the clay mineral of the clay coating film is 0.1 g to 100 g in terms of solid matter per 1 m$^2$ of the surface area.

4. The heat-resistant roll according to claim 1, wherein a swelling power of the clay mineral of the clay coating film is 15 ml/2 g or more.

5. A method for producing the heat-resistant roll according to claim 1 comprising:
   fabricating a roll part uniformly comprising 5 wt % or more of a clay mineral;
   grinding a roll surface of the roll part;
   conducting a surface treatment in which the ground roll surface is smoothed in a moisturized state; and
   forming a coating film of a clay mineral covering 80% or more of the surface-treated roll surface.

6. The method for producing the heat-resistant roll according to claim 5, wherein the step of conducting a surface treatment comprises a first step of moisturizing the ground roll surface and a second step of smoothing the moisturized roll surface.

7. The method for producing the heat-resistant roll according to claim 6, wherein in the second step, the roll surface is smoothed by rotating the roll part while pressing a member against the moisturized roll surface.

8. The method for producing the heat-resistant roll according to claim 5, wherein in the step of conducting a surface treatment, the surface treatment is conducted by pressing a moisturized member against the roll surface of the roll part that is rotating.

9. The method for producing the heat-resistant roll according to claim 5, wherein the amount of the clay mineral forming the coating film is an average 0.1 g to 100 g in terms of solid matter per 1 $m^2$ of the surface area.

10. The method for producing the heat-resistant roll according to claim 5, wherein a swelling power of the clay mineral covering the surface is 15 ml/2 g or more.

11. The method for producing the heat-resistant roll according to claim 5, wherein the clay mineral covering the surface comprises bentonite.

12. The method for producing a heat-resistant roll according to claim 5, wherein, in the step of forming the clay coating film forming, a clay mineral-containing liquid is applied to the surface-treated roll surface, followed by drying, thereby to form the coating film of the clay mineral, and an average film thickness of the coating film is 0.01 mm to 5 mm.

13. A method for producing the heat-resistant roll according to claim 1 comprising:
   fabricating a roll part uniformly comprising 5 wt % or more of a clay mineral;
   grinding a roll surface of the roll part; and
   conducting a surface treatment in which the ground roll surface is smoothed in a state moisturized with a clay mineral-containing liquid, whereby a coating film of the clay mineral covering 80% or more of the roll surface is formed.

14. A method for producing plate glass wherein the heat-resistant roll according to claim 1 is used as a conveyance roll.

* * * * *